UNITED STATES PATENT OFFICE.

WILLIAM AUGUSTUS ROWELL, OF JESMOND GARDENS, NEWCASTLE-UPON-TYNE, ENGLAND.

MANUFACTURE OF CHROMIC ACID.

SPECIFICATION forming part of Letters Patent No. 322,011, dated July 14, 1885.

Application filed October 24, 1884. (No specimens.)

*To all whom it may concern:*

Be it known that I, WILLIAM AUGUSTUS ROWELL, a subject of the Queen of Great Britain, residing at Jesmond Gardens, Newcastle-upon-Tyne, England, chemical manager, have invented certain new and useful Improvements in the Manufacture of Chromic Acid or Trioxide of Chromium; and I do hereby declare that the following is a full, clear, and exact description of the invention, which will enable others skilled in the art to which it appertains to make and use the same.

This invention has for its object improvements in the manufacture of chromic acid or trioxide of chromium.

The first operation in my process is the production of chromate of strontia, and for the sake of economy a certain quantity of chromate of baryta. I use a soluble chromate—such as chromate of soda, lime, or potash, or mixtures of any of these—and bring such chromate or chromates into solution. This solution should neither contain sulphates nor carbonates, nor should it contain an acid chromate. Should it contain carbonates, they are best neutralized with a sufficient quantity of muriatic acid. If a bichromate is present, it should be converted into a normal chromate with soda or some other alkali. If sulphates are present, they must be allowed for in the process to be described. To this solution as above described, is added a solution of some soluble strontium salt in the proportion of the chemical equivalent of the sulphates and chromates present with some excess. I prefer the chloride on account of its cheapness and ease of preparation, but the hydrate can be used in some cases as can the nitrate in all; but it is evident that these salts have no advantage over the chloride.

Chloride of strontium is cheaply prepared for this use by reducing the sulphate with coal and dissolving the resulting sulphide in muriatic acid. Sulphureted hydrogen escapes and can be used for making part of the necessary sulphuric acid, and chloride of strontium remains in solution.

The addition of the solution of chloride of strontium to the chromate solution (which is best done in the hot and with boiling and agitation) results in the precipitation of most of the chromic acid present in solution as chromate of strontium, and I prefer to have my solutions of such strength as will result in the production of one and one-half pound of chromate of strontium for every gallon of supernatant liquor left after the above-mentioned precipitate has subsided thoroughly. Considerable variation from this, however, is possible, as it mainly affects the amount of washing required by the precipitate. The chromate of strontium is thoroughly freed from salts and the liquor from which it has been precipitated by repeated boiling and washing and is ready for further treatment.

All the liquors which have been separated from the chromate of strontium are treated with chloride of baryta in excess of the chemical equivalent of the chromic acid they still contain in solution, owing to a slight solubility chromate of strontia possesses in water. This results in the almost complete separation of the chromic acid as insoluble chromate of barium which, after washing thoroughly, is ready for use as below.

The chromate of baryta obtained as above is treated hot, preferably boiled, with large excess of tolerably dilute sulphuric acid. One part concentrated acid to fifteen parts water will be found a convenient proportion. This treatment results in the formation of sulphate of baryta and solution of the chromic acid in the dilute sulphuric acid. This mixture of sulphuric and chromic acids having been separated by decantation or otherwise from the insoluble sulphate of baryta, is treated hot, preferably boiled with an amount of chromate of strontium chemically equivalent to the sulphuric acid present. This results in the formation of chromic acid in solution and feebly soluble sulphate of strontium. The solution of chromic acid is separated from the residue of sulphate of strontium and evaporated to dryness; and it is advisable that a low heat be used in this operation, as, should the temperature rise much toward the end of the evaporation, chromium dioxide and even chromium sesquioxide is formed, oxygen escaping. The chromic acid as formed contains a little sulphate of strontia, from most of which it may be freed by resolution in water, without boiling, settling, decanting, and again evaporating to dryness. This acid may also be sold in solution.

Although I consider the above the most economical mode of conducting my process, I sometimes vary it as follows: The precipitation of the chromic acid which remains in solution after the treatment with chloride of strontium may be omitted. This variation will result in a loss of about five per cent. of the chromic acid; or I precipitate the whole, or nearly the whole, of the chromic acid from the original solution, as chromate of baryta, and after thoroughly washing the precipitate treat it in the same manner as the chromate of strontium with sulphuric acid moderately dilute. The result here, however, is different, as I find that one equivalent of sulphuric acid will not thoroughly decompose chromate of baryta in one operation. I obtain, therefore, sulphate of barium mixed with some chromate of baryta, and chromic acid mixed with some sulphuric acid in solution. The mixture of sulphate and chromate of baryta I treat with fresh sulphuric acid once or more, as may be necessary, and thus obtain all the chromic acid in solution, using this sulphuric acid, which contains some chromic acid, to act on fresh chromate of baryta. To free the chromic acid from the sulphuric acid, which, as mentioned above, it contains, I either treat it with successive quantities of chromate of baryta or with chromate of strontia chemically equivalent to the sulphuric acid present, in either case obtaining solution of chromic acid, which otherwise is treated as above described.

When I refer to soluble chromates, solution of chromates, &c., which are to be operated on by my process, I include any solutions which may be obtained in processes for the manufacture of chromate or bichromate or terchromate of soda, potash, lime, &c., which contain chromic acid, free or combined; also any crude solid containing or capable of yielding chromic acid in solution, free or combined.

When I refer to "some soluble strontuim salt," I do not include the use of salts whose acid would react in a destructive way on the chromic acid to be precipitated, as would happen were a sulphide used. Chloride of strontium I prefer; but there might be advantages in using some salt—such as the hydrate—where the base previously combined with the chromic acid had a value, as in the case of bichromate of potash, where the use of hydrate of strontia and hydrate of baryta would dispense with the use of any other alkali to render the bichromate normal, and would, after precipitation of the chromates, leave caustic potash, a valuable product in solution.

When I speak of adding "solution of strontium salts" to solution of chromates, I include the variation of this which would occur were the soluble chromates added solid to the solution of strontium salts or the soluble strontium salt added solid to the solution of chromates.

When I speak of treating sulphuric acid with chromate of strontia or chromate of strontia with sulphuric acid in "equivalent proportions," I wish to be understood as meaning that I consider such the most advisable, and only necessary amount of either of these substances that must be added to one another. By using less sulphuric acid than an equivalent quantity, chromic acid is still obtained (contaminated, however, with chromate of strontium,) and by using more sulphuric acid, chromic acid is still obtained, but contaminated with sulphuric acid. In the first case either a fresh washing with acid (an unnecessary proceeding if my process as described be adhered to) or wash of chromic acid ensues. In any case I find that this decomposition occurs whichever reagent be in excess in equivalent proportions in one operation.

Having thus described my invention, I claim and desire to secure by Letters Patent of the United States of America—

1. The manufacture of chromic acid or trioxide of chromium by producing, in a solution of a chromate, a precipitate of chromate of strontium and afterward decomposing the chromate of strontium with sulphuric acid, substantially as described.

2. The manufacture of chromic acid or trioxide of chromium by producing, in a solution of a chromate, a precipitate of chromate of strontium, then completing the precipitation of the chromate solution by means of barium, afterward decomposing this chromate of barium with excess of sulphuric acid, and finally applying the same acid to decompose chromate of strontium, substantially as described.

3. The manufacture of chromic acid or trioxide of chromium by producing, in a solution of a chromate, a precipitate of chromate of barium, and then treating the said precipitate methodically with successive quantities of sulphuric acid in such manner as on the one hand to liberate the whole of the chromic acid, and on the other to remove the whole of the sulphuric acid from solution, substantially as described.

4. In the manufacture of chromic acid or trioxide of chromium, separating sulphuric acid from chromic acid by precipitating the former acid by means of chromate of strontium, substantially as described.

WILLIAM AUGUSTUS ROWELL.

Witnesses:
HENRY SPRAGGON HAWDON,
SAMUEL TUKE MEYNELL.

DEPARTMENT OF THE INTERIOR,
UNITED STATES PATENT OFFICE,
WASHINGTON, D. C., *August 4, 1885.*

In compliance with the request of the patentee, Letters Patent No. 322,011, granted July 14, 1885, upon the application of William Augustus Rowell, of Jesmond Gardens, New Castle-upon-Tyne, England, for an improvement in the "Manufacture of Chromic Acid," is hereby limited so as to expire at the same time with the patent of the following named having the shortest term to run, viz: French Patent, dated December 20, 1884, No. 166,039; Belgian Patent, dated December 22, 1884, No. 67,294.

It is hereby certified that the proper entries and corrections have been made in the files and records of the Patent Office.

This amendment is made that the United States Patent may conform to the provisions of Section 4887 of the Revised Statutes.

M. V. MONTGOMERY,
*Commissioner of Patents.*

Approved:
G. A. JENKS,
*Acting Secretary of the Interior.*